United States Patent [19]

Fraser et al.

[11] Patent Number: 5,329,589
[45] Date of Patent: Jul. 12, 1994

[54] MEDIATION OF TRANSACTIONS BY A COMMUNICATIONS SYSTEM

[75] Inventors: Alexander G. Fraser, Bernardsville; Carlos A. Perea, Somerset; Roy P. Weber, Bridgewater, all of N.J.

[73] Assignee: AT&T Bell Laboratories, Murray Hill, N.J.

[21] Appl. No.: 71,950

[22] Filed: Jun. 3, 1993

Related U.S. Application Data

[63] Continuation of Ser. No. 661,711, Feb. 27, 1991, abandoned.

[51] Int. Cl.$^5$ .................... H04M 11/04; G06F 15/22
[52] U.S. Cl. ........................ 379/91; 379/93; 379/95; 364/401; 364/408
[58] Field of Search ............... 379/91, 92, 93, 95, 379/96, 97, 98, 143, 144, 201; 402/8, 22, 24; 364/401, 408; 325/379, 380, 381

[56] References Cited

U.S. PATENT DOCUMENTS

| | | | |
|---|---|---|---|
| 3,920,908 | 11/1975 | Kraus . | |
| 4,191,860 | 3/1980 | Weber . | |
| 4,291,198 | 9/1981 | Anderson et al. | 379/96 |
| 4,757,267 | 7/1988 | Riskin | 379/113 |
| 4,969,183 | 11/1990 | Reese | 379/92 |
| 4,996,705 | 2/1991 | Entenmann et al. | 379/91 |
| 5,010,238 | 4/1991 | Kadano et al. | 902/8 |
| 5,012,077 | 4/1991 | Takano | 902/22 |
| 5,016,270 | 5/1991 | Katz | 379/92 |
| 5,120,945 | 6/1992 | Nishibe et al. | 235/380 |

FOREIGN PATENT DOCUMENTS 0338568  4/1989  European Pat. Off. ...... G07G 1/14
88/10467 12/1988  World Int. Prop. O. ..... G06F 7/08

OTHER PUBLICATIONS

U.S. Ser. No. 359,823, Medamana et al., Authenticated Communications Access Service, filed May 31, 1989.
R. P. Weber, Declaration under 37 C.F.R. 1.56 and 37 C.F.R. 1.68.
K. J. Baughan, et al., "Transaction Capabilities-The New Dimension" *Second IEEE National Conference on Telecommunications*, Apr. 89, York, GB, pp. 411–417.
J. Mizusawa, et al., "IC Card-Based Advanced Man-Machine Interface for Public Switched Telephone Network Service", *Electronics and Communications in Japan*, vol. 73, No. 1, Jan. 1990, New York, USA, pp. 36–54.
N. Redding, "Network Services Databases", *IEEE Global Telecommunications Conference*, Session 37, Paper 6, vol. 3, Dec. 1986, Houston, US pp. 1336–1340.

*Primary Examiner*—Curtis Kuntz
*Assistant Examiner*—Jason Chan
*Attorney, Agent, or Firm*—Gordon E. Nelson

[57] ABSTRACT

Methods and apparatus for employing a communications system with actively connects communicating entities to mediate transactions. Disclosed are general methods and apparatus for mediating transactions, methods and apparatus permitting information from one transaction to be used in other transactions, and methods and apparatus for performing credit card transactions in which the vendee need not disclose his credit card to the vendor. An implementation of a system for performing credit card transactions in a stored program-controlled telephone switching network is also disclosed.

28 Claims, 4 Drawing Sheets

MEDIATION OF TRANSACTIONS BY A COMMUNICATIONS SYSTEM

This application is a continuation of application Ser. No. 07/661,711, filed on Feb. 27, 1991, now abandoned.

BACKGROUND OF THE INVENTION

1. Field of the Invention

The invention concerns communications systems generally and particularly concerns the use of a communications system to mediate transactions among entities reachable by the communications system.

2. Description of the Prior Art

Figure 1:
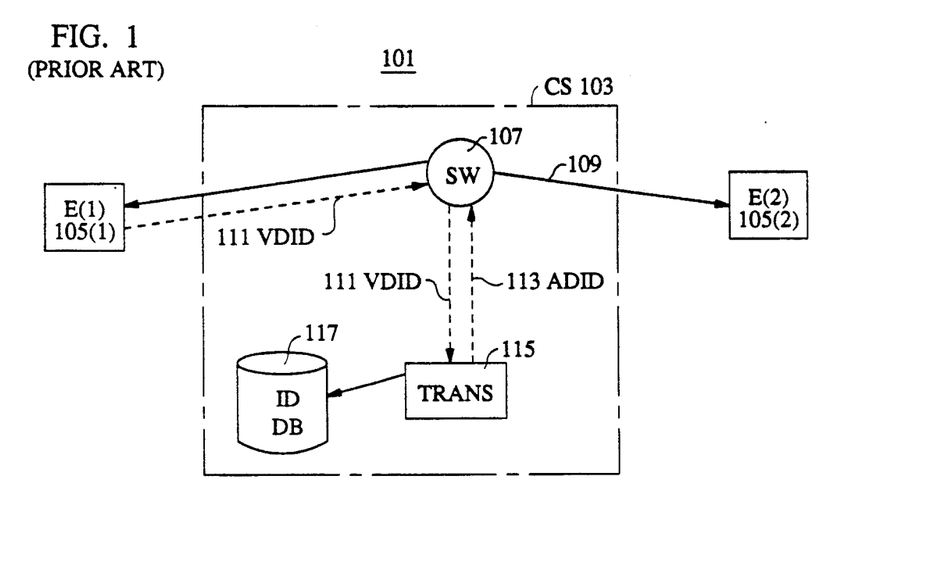
FIG. 1 is an overview of a prior-art telephone number translation system.

Communications systems such as the telephone system have long done more than simply connect a first entity to a second entity specified by the first entity. A number of forms of telephone service transform a first telephone number specifying an entity into a second such telephone number. FIG. 1 is a schematic overview of such telephone number transformation services. In the figure, a dashed line indicates a path for transmitting signalling information, while a solid line indicates a path for transmitting messages. In FIG. 1, entity 1 (E(1)) 105(1) is a caller wishing to communicate with entity 2 (E(2)) 105(2) via communications system (CS) 103. To initiate the communication, entity 1 105(1) employs a virtual destination identifier 111 which is different from the actual destination identifier used within communications system 103 to establish communication with the entity. Using a signalling path, entity 1 105(1) provides virtual destination identifier 111 to communications system 103. Switch 107 in communications system 103 is able to recognize virtual identifiers 111 from their forms. On recognizing that the destination identifier provided by entity 105(1) is a virtual destination identifier, switch 107 provides virtual destination identifier 111 via a signalling path to translator 115, a facility in communications system 103 which translates virtual destination identifiers 111 into actual destination identifiers 113. In making the translation, translator 115 uses destination identifier data base 117, which contains actual destination identifiers 113 corresponding to virtual destination identifiers 111. Once the translation is made, translator 115 provides actual destination identifier 113 to switch 107, which uses actual destination identifier 113 to connect entity 1 105(1) to entity 2 105(2) via a message path, as shown by solid arrow 109.

One example of such a service is the toll-free 800 service. In this service, which is described in detail in Weber, U.S. Pat. No. 4,191,860, Data Base Communication Call Processing Method, issued Mar. 4, 1980, customers throughout a given area use a telephone number which has 800 as a prefix to reach an entity. On receiving the 800 number, the telephone company's switching system generates a control message including the 800 number. The control message is sent to a data base system via the common channel interoffice signalling facilities (CCIS) used as a signalling path by the telephone company. The data base system uses the 800 number to obtain an unlisted telephone number for the entity and provides the unlisted number via a second CCIS message to the switching system, which uses the unlisted number to connect the customer to the entity to which the 800 number belongs and charges the call to the unlisted number.

As indicated in Weber, an 800-number call can be routed based on the area in which it originates. Consequently, 800 number service can be used as locator service. In such a service, a customer dials an 800 number designating sources of specific goods or services and is connected by the communications system to the source of such goods or services closest to the customer or to a recipient of the goods or services. One kind of locator service is described in detail in Riskin, U.S. Pat. No. 4,757,267, Telephone System for Connecting a Customer to a Supplier of Goods, issued Jul. 12, 1988. In Riskin's locator service, a non-telephone company owned data base system operating in a computer which is connected to a telephone switch determines from the 800 number the type of goods or services in which the customer is interested and determines from the caller's telephone number where the caller is located. The data base system then determines from a geographically-ordered list of dealers which dealer is closest to the customer and causes the switch to call the closest dealer and connect the dealer with the customer.

In one embodiment of Riskin's locator service, the caller's telephone number is provided to the data base system by the telephone company's Automatic Number Identification Service (ANI), while the 800 number is provided by the telephone company's Dialed Number Identification Service (DNIS). In another embodiment, the non-telephone company-owned data base system would have access to the CCIS facility, and would receive the caller's telephone number and the 800 number via CCIS and would provide the telephone number of the closest dealer to the telephone system via CCIS. The telephone system would then connect the customer to the closest dealer. Further refinements disclosed by the Riskin reference include using digital voice to request telephone numbers from the caller if they are not provided by the telephone company via ANI or DNIS and using digital voice to inform the dealer of the kind of transaction being initiated by the customer.

As the Riskin reference shows, number translation systems can be quite complex. However, one characteristic which they all have in common is that the communications system 103 does nothing more than establish a path by means of which entities using the communications system may exchange messages. Communications system 103 plays no role whatever in whatever transaction between the entities may be accomplished by the messages.

In some instances, the communications system plays a role in the transaction itself. One example of such a system is that disclosed in U.S. Pat. No. 3,920,908, Constantine R. Kraus, Buyer Credit Service for a Telephone System, issued Nov. 18, 1975. As disclosed at col. 2, line 28 through col. 4, line 11 of the reference, the system of Kraus provides credit information for a customer ordering by telephone to a vendor. When the customer calls to place an order, he uses a special class of telephone number. The telephone system provides the special number and the number of the telephone from which the customer is calling to a TSPS office. The TSPS office in turn sets up a connection between the vendor identified by the special telephone number and a credit center and provides the calling telephone number to the credit center. The credit center uses the calling telephone number to search a credit data base for credit information about the customer and transmits the credit information to the vendor. If the vendor finds the credit information satisfactory, he signals the TSPS office to that effect and the TSPS office then connects him with the customer.

Another is the system disclosed in John B. Medamana et al., U.S. Pat. No. 5,181,258, Authenticated Communication Access Service, issued Jan. 19, 1993 and assigned to the assignees of the present patent application. In the system of the reference, if an entity such as a bank or a broker wishes to restrict access to a select set of customers, the entity provides an 800 number to the customers. The 800 number serves as a transaction identifier. When a switch receives the 800 number, it does not immediately set up the call to the unlisted number for the entity which corresponds to the 800 number; instead, it indicates to a transaction manager in the the telephone system that a call has arrived which it must mediate. The transaction manager employs the switch to obtain identification information from the calling party. The identification information may be the calling party's telephone number, obtained via ANI, or a personal identification number (PIN) which the customer enters using his touch tone telephone in response to digital voice prompts from the switch. The transaction manager then supplies the identification information to a third entity, which uses information in a transaction data base to determine whether the calling party is entitled to make the transaction. The third entity then provides transaction information to the transaction manager, if the calling party is entitled to make the transaction, the transaction information will contain further information about the transaction. The transaction manager informs the switch whether the transaction is permitted, and if it is, the switch makes the call to the second entity and provides it with the further information about the transaction.

A third example of the use of a communications system to mediate a transaction is found in Entenmann, et al., Use of Telecommunications Systems for Lotteries, U.S. Pat. No. 4,996,705, issued Feb. 26, 1991, and having the same assignee as the present patent application. This references discloses a system in which a lottery customer dials a telephone number to enter a lottery. The system determines either from the customer's phone number or a credit card number which it requests from him whether the customer is eligible to enter the lottery. If the customer is, the customer is prompted to provide information from which a number for the customer's entry in the lottery can be generated. The system then generates the number and determines whether the number is a winning number. If it is, it informs the customer that he has won, prints out a record of the transaction at the lottery office, and connects him to an operator, who records additional data supplied by the customer.

Figure 2:
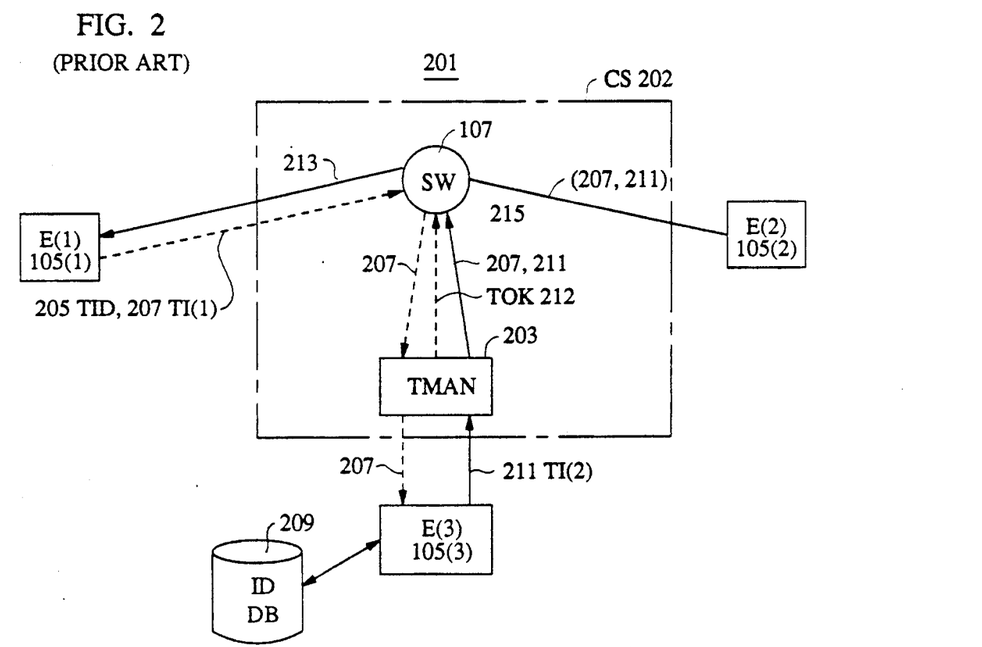
FIG. 2 is an overview of a prior-art system in which the telephone system mediates a transaction.

FIG. 2 presents an overview of a system 201 in which the systems just described might be implemented. In system 201, CS 202 mediates a transaction between entity 1 105(1) and entity 2 105(2) using information contained in a transaction data base (TDB) 209 belonging to a third entity 105(3). When entity 1 105(1) in system 201 wishes to make a transaction with entity 2 105(2), entity 1 105(1) provides communications system 202 with a transaction identifier 205 identifying the transaction. Included in transaction identifier 205 may be a virtual identifier for entity 2 105(2). When switch 105 receives transaction identifier 205, it sets up a message path between entity 1 105(1) and switch 107 and employs a technique such as digital voice to request input of transaction information 1 (TI(I)) 205 from entity 105(1). An example of such transaction information might be an identifier specifying that entity 1 may carry out the transaction. Switch 107 provides transaction information 1 207 to transaction manager 203, running in a processor which has access to switch 107. Transaction manager 203 further has access to entity 3 105(3), and provides transaction information 1 207 to entity 3. Entity 3 uses transaction information 1 207 to look up transaction information 2 207 in transaction data base 209 and provides transaction information 2 211 via a data link message path to transaction manager 203. If transaction information 2 211 indicates that entity 1 105(1) has the fight to make the transaction, transaction manager 203 provides a transaction OK (TOK) 212 signal indicating that the transaction is permitted to switch 107, which establishes message path 215 between switch 107 and entity 2 105(2). Transaction manager 203 then uses the message path to provide transaction information 1 207 and transaction information 2 211 to entity 2 105(2), which then uses message paths 213 and 215 to complete the transaction with entity 1 105(1). On the other hand, if transaction information 2 211 indicates that entity 1 105(1) does not have the fight to make the transaction, transaction manager 203 indicates to switch 107 via transaction OK 212 that the transaction is not permitted, and switch 107 does not establish path 215 and terminates path 213. In this case, transaction manager 203 may further cause switch 107 to provide a termination message via message path 213 to entity 1 105(1).

While the foregoing systems represent a significant advance over the number translation systems, these systems do not provide a general technique by means of which a communications system may mediate a transaction, nor do they take full advantage of the possibilities arising out of mediation of a transaction by the communications system. In particular, the references do not show how to make a telephone transaction interruptible or how to use a communications system to mediate an ordinary credit card transaction. It is thus an object of the present invention to provide such a general technique, and to permit the construction of improved systems for performing transactions using a communications system.

SUMMARY OF THE INVENTION

The invention is a method of employing a communications system to mediate different types of transactions involving entities reachable by the communications system. Each transaction involves a plurality of entities which have information about the transaction. The method includes the following steps:

receiving a transaction type specifier specifying one of the types of transactions in the communications system;

providing the transaction type specifier to a transaction manager in the communications system;

in the transaction manager, using the transaction type specifier to select a transaction algorithm corresponding to the transaction type from a set of transaction algorithms; and in the transaction manager, employing the communications system to obtain information about the transaction from at least one entity involved in the transaction and provide the information about the transaction to at least one other entity involved in the transaction as required by the transaction algorithm.

In further aspects of the invention, a transaction record is provided for making the transaction interruptible and a system is provided for making credit card transactions via the communications system.

Other objects and advantages of the invention will become apparent to those skilled in the arts to which the invention pertains after perusal of the following Drawing and Detailed Description of the invention.

Reference numbers in the Drawing have two parts. The two least-significant digits identify an item in a figure; the remaining digits identify the figure in which the item first appears. Thus, an item With the reference number 101 first appears in FIG. 1.

DETAILED DESCRIPTION

The following Detailed Description will first present certain definitions which are required for understanding of the discussion, will then disclose a general example of a communications system which hides transaction information while mediating a transaction, followed by a specific example of such a communications system. Next, the Detailed Description will disclose a communications system which is generally adapted to mediating many types of transactions, and finally, the Detailed Description will disclose an embodiment of the specific example in the telephone system.

Definitions

The following definitions of communications systems and entities involved in a transaction are important for proper understanding of the disclosure.

By "communications system" is meant any communications system in which a node of the communications system can do more than simply passively forward data to a location in the system. One example of such a communications system is a telephone system of any size, ranging from a system consisting of telephones connected by a PBX through telephones connected by a world-wide switching system. Other examples are data networks in which a network node can initiate a session and video networks in which there are interactions between the network and the user.

By "entity" is meant any party to a transaction other than the communications system in its capacity as communications system. For example, if the company providing the communications system also provides identification or credit services, the company is an entity involved in the transaction to the extent that the identification or credit services are involved in the transaction.

Figure 3:
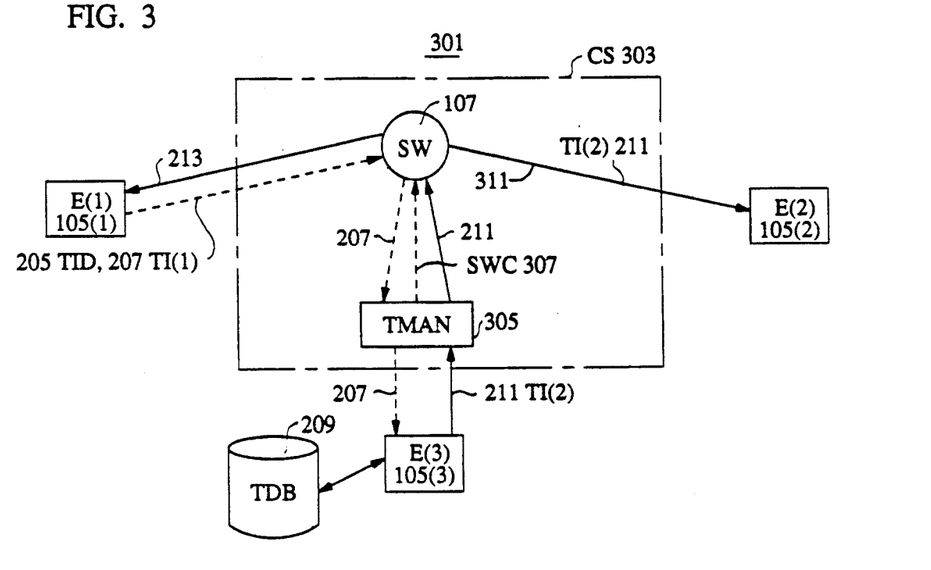
FIG. 3 is an overview of a system of the invention in which the communications system hides information while it mediates the transaction.

Hiding Information while Mediating a Transaction:
FIG. 3

One reason for involving a mediator in a transaction is to make it possible to carry out the transaction while hiding certain information necessary to the transaction from other parties to the transaction. For example, in a labor negotiation, the union negotiators need to know the economic condition of the company they are negotiating with; the company, on the other hand, may not wish to make such sensitive business information available to the union negotiators. One way to solve this problem is to employ a mediator who is trusted by both parties to evaluate the business information and communicate his evaluation, but not the information, to the union negotiators. As will become clear from the following, this function of making a transaction possible while hiding certain information can be carried out by a communications system.

FIG. 3 shows a system 301 in which a communications system 303 not only mediates a transaction, as did communications system 202 of the Mealamana reference, but further hides information obtained from one of the entities involved in the transaction from another entity in the transaction. As with Medamana, entity 1 105(1) begins the transaction by a call which identifies the type of transaction, as indicated by transaction, ID (TID) 205. When switch 107 receives TID 205, it activates transaction manager (TMAN) 305. Transaction manager 305 provides switch control signals 307 to switch 107. These signals cause switch 107 to provide digital voice prompts requesting transaction information 1 207 from entity 1 105(1). Entity 1 105(1) provides transaction information 1 207 via a signal path to switch 107, which in turn provides it to transaction manager 305. Transaction manager 305 then provides transaction information 1 207 to entity 3 105(3), which uses it to query transaction data base 209 and returns transaction information 2 211 via a data link. Transaction manager 305 then signals switch 107 via switch control signals 307 to establish a message path 311 between transaction manager 305 and entity 2 105(2) and provides transaction information 2 211 to entity 2 105(2). As may be seen from FIG. 3, entity 2 105(2) never receives transaction information 1 207; transaction information 1 207 is thus effectively hidden from entity 2 105(2). A further characteristic of system 301 is that there may be no need for direct communication between entity 1 105(1) and entity 2 105(2), or indeed between any of the entities involved in the transaction. If transaction information 2 211 contains all of the information which entity 2 requires to complete the transaction between it and entity 1, entity 2 105(2) need not exchange messages with entity 1 105(1).

In many cases, an entity participating in a transaction may wish to interrupt a transaction before it is complete and then complete the transaction later. In order to accomplish this, transaction data base 209 must maintain records of transactions. Such records are shown as transaction records (TR) 701 in FIG. 7. Each transaction record 701 contains transaction information (TINF) 705, whose contents depend on the type of the transaction and the stage at which it was interrupted, and may also contain a transaction number 703, by which the entities participating in the transaction can identify the transaction. In one embodiment of such a system 301 which permits transactions to be interrupted and resumed, an entity can indicate that he wishes to interrupt the transaction. Transaction manager 305 can then respond to this indication by providing transaction number 703 to at least the entity wishing to interrupt. When the entity wishes to continue, it dials the number originally used to begin the transaction, and transaction manager 305 responds by causing switch 107 to prompt the entity to indicate whether it is beginning a new transaction or continuing an old one. In the latter case, transaction manager 305 causes switch 107 to prompt the entity to provide transaction number 703, transaction manager 305 provides the transaction number to entity 105(3) which manages transaction data base 209, and entity 105(3) uses transaction number 703 to locate transaction record 701 and to provide record 701 to transaction manager 305. Transaction manager 305 then uses the information in transaction information 705 to resume the transaction.

Figure 7:
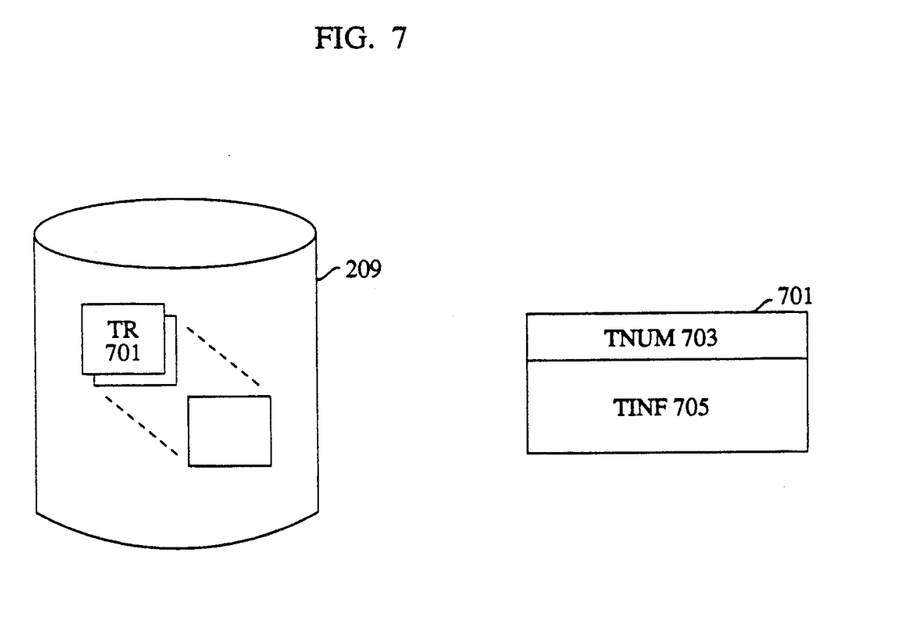
FIG. 7 is a diagram of transaction records used in certain embodiments of the system of FIG. 3.

In another embodiment, transaction records 701 involving an entity can be organized such that all of the transaction records 701 for an entity can be located in time order. In this case, when an entity wishes to resume a transaction, transaction manager 305 can begin with the most recent transaction for the entity wishing to resume and can use transaction information 705 to cause switch 107 to provide a summary of the transaction to the entity. The summary can be provided by using ASCII-to-speech translation technology to translate the relevant portions of TINF 705 into speech. If the entity determines from the summary that the transaction is the one it wishes to resume, the entity can indicate that fact via a signal to transaction manager 305, which can then use transaction record 701 which was the source of the summary to resume the transaction.

The techniques described above for resumption of a transaction can also be used in situations in which a transaction has several separate stages. In such a multistage transaction, there will be a transaction record 701 for the transaction. Transaction record 701 will maintain a record of the transaction as it currently stands. During the first stage of the transaction, the entities participating therein may be given transaction number 703 for the transaction. When a party begins the next stage of the transaction, transaction manager 305 causes switch 107 to request transaction number 703 from the party and then uses the transaction number to locate transaction record 701 for the transaction. Transaction manager 305 can then respond to the record to perform the next stage of the transaction as described above, updating the record as it performed the transaction.

Similarly, a given transaction can give rise to other possible transactions. For example, if what is involved is a purchase by one entity of goods from another entity, the purchaser may want to reach the second entity if he has questions about or problems with the goods and the second entity may want to reach the purchaser if he is temporarily out of stock or if a recall is required. Again, transaction record 701 can be used in these other transactions. Of course, as indicated above, techniques other than transaction numbers can be used to associate transaction records with entities involved in a transaction. For example, transaction records may be associated with and reachable by means of a telephone number or other identification name or number which identifies the entity. Indeed, more than one technique may be used for a given record. Transaction numbers can be used to provide access to individual records, while entity identification numbers can be used to provide access to all of the transactions involving a given entity. Additionally, the transaction record may contain a time of transaction and transaction records for an entity may be retrieved in a time-related order.

Figure 4:
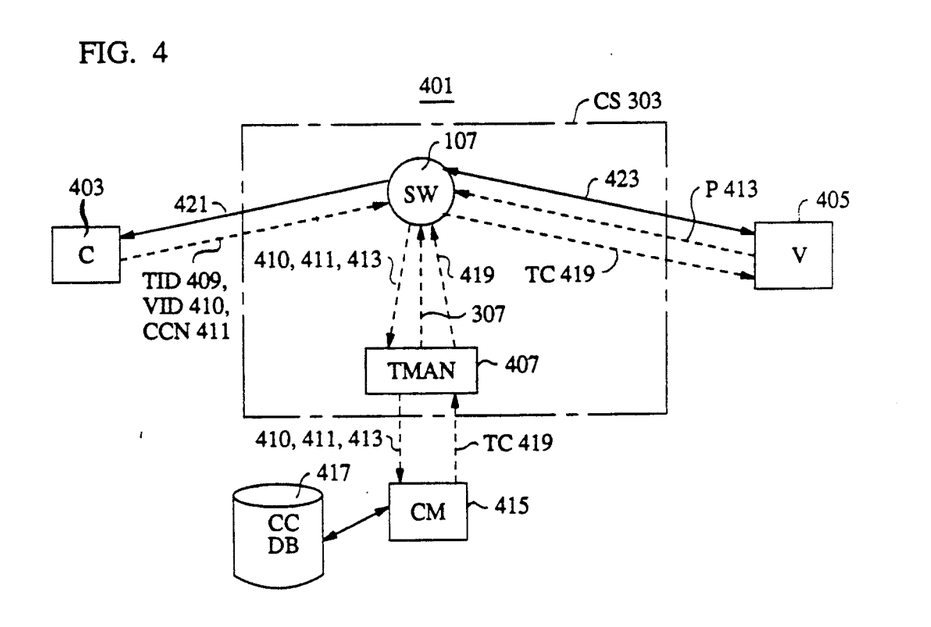
FIG. 4 is an overview of a specific system which hides information while mediating a transaction.

Using Hiding in a Credit Card Transaction System: FIG. 4

The ability of a system such as system 303 to hide information from participants in a transaction is particularly advantageous when the transaction is a telephone credit cud transaction. Such transactions are presently performed as follows: First, the customer calls the vendor (often using an 800 number). Once customer and vendor are connected, the customer determines whether the transaction is to be a credit card transaction. The vendor then tells the customer the price, and if it is a credit card transaction, the vendor asks the customer for his credit card number. The customer then hangs up and the vendor uses the credit card company's verification system to verify the customer's credit. Having done that, the vendor completes the credit card transaction and mails the customer the purchase. There are several problems with this mode of carrying out the transaction. The most important problem from the customer's point of view is that he must disclose his credit card number to someone he does not know. The problem from the vendor's point of view is dealing with the credit card system when all the vendor really wants to know is whether the customer can pay.

FIG. 4 shows a system 401 which addresses and solves these problems. To begin a transaction, customer C 403 employs communications system 303 to call vendor 405. The number used to call vendor 405 serves both to identify a kind of transaction and the vendor, and so functions both as a transaction identifier 409 and a vendor identifier 410. When switch 107 receives transaction identifier 409, it responds by activating transaction manager 407 and providing vendor ID 410 to it. Transaction manager 407 retains vendor ID 410 and causes switch 107 to set up message path 421 between switch 107 and customer 403 and to provide a digital voice message to customer 403 in which customer 403 is asked for his credit card number. Customer 403 inputs credit card number 407 using the Touch-Tone ™ buttons on his telephone. Switch 107 receives the touch tone signals produced when the buttons are pushed, converts them to digital data, and provides the number to transaction manager 407. Transaction manager 407 retains the credit card number and causes switch 107 to set up message path 423 and connect the customer with the vendor via message paths 421 and 423. The customer and the vendor then discuss the transaction and come to an agreement on the price. Vendor 405 then uses the Touch-Tone buttons on his telephone to input the price (P413). When switch 107 receives the touch tone signals, it provides them to transaction manager 407, which in turn provides vendor identifier 410, credit card number 407 and price 413 to credit manager 415. Credit manager 415 determines from information in credit card data base 417 whether customer 403 can complete the purchase. If customer 403 can, credit manager 415 provides a transaction confirmation message 419 to transaction manager 407, which in turn provides the message to vendor 405, who can terminate or continue the interaction as he pleases. If the information in credit card data base 417 indicates that the transaction can take place, credit manager 415 debits the amount of the transaction from customer 403's account and credits it to vendor 405's account after sending transaction confirmation signal 419 to transaction manager 407. Other information required for the transaction, for example the mailing address of customer 403, may be obtained directly from customer 403 or from information in credit card data base 417 concerning customer 403.

Many variations on the above system are of course possible. For example, vendor ID 410 could be derived from the telephone number in the fashion described above for 800 numbers, or it could be derived from a geographical list of numbers for dealers, as in the Riskin reference, or the dealer could provide an identifier himself along with the amount. Similarly, credit manager 415 and credit card data base 417 could be entities which were totally separate from communications system 303, or they could be pan of a credit system offered by the company which provides communications system 303 to customers of the company. For example, if the purchases made by customers 403 from vendor 405 were relatively small, the price could be added to customer 403's telephone bill. In such a situation, customer 403's telephone number, provided by the ANI service mentioned above, might even serve as credit card number 407. Customer 403's telephone number could additionally be used to verify customer 403's identity to credit manager 415. In such an embodiment, if customer 403's telephone number as provided by ANI was different from the one listed for him, customer 403 could be asked to provide his home telephone number in addition to his credit card number.

Additionally, all the techniques described in the discussion of system 301 above for interrupting a transaction, performing a transaction in stages, or performing related transactions can be used in system 401. A transaction record 701 used in system 401 might contain the date and time of the transaction, the identity, address, and telephone number of customer 403, the identity, address, and a telephone number of vendor 405, the product purchased, and the price, as well as other useful information. Further, the techniques described in connection with system 301 for retrieving a transaction record 701 can be used in system 401.

Examples of situations in which transaction records 701 can be usefully employed in system 401 include interrupted transactions and collateral transactions such as later calls by customer 503 to vendor 405 concerning the transaction and vice-versa. Depending on the situation (as indicated by the state of transaction 705 in the relevant transaction record 701), transaction manager 407 can route customer 403's call to the proper party at vendor 405 and can provide information relevant to the situation from transaction record 701 to the proper party at vendor 405.

Figure 5:
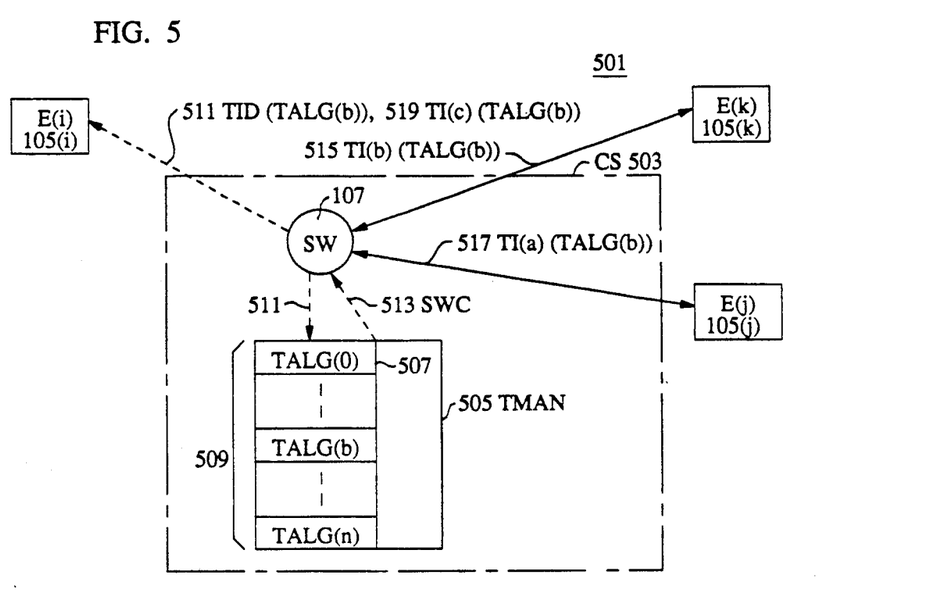
FIG. 5 is an overview of a general system for employing the communications system to mediate transactions.

A General System for Mediating Transactions: FIG. 5

The systems of Kraus, Entenmann, and Medamana disclosed in the discussion of the prior art and the systems disclosed in the present patent application are species of a genus of systems in which a communications system mediates a transaction. FIG. 5 discloses a system 501 which permits a communications system 503 to provide as many of the species as is convenient. In system 501, transaction manager 505 includes a list 509 of transaction algorithms 507(0 . . . n). Each transaction algorithm on the list specifies a different type of transaction which system 501 mediates.

When one of the entities 105 which is reachable by communications system 503 wishes to initiate a transaction, it provides a transaction identifier 511 for the type of transaction it wishes to perform to switch 107 Here, the entity is entity 105(i). As previously indicated, transaction identifier 511 might be a special telephone number. It might also be a suffix to a special telephone number, and it might further be elicited by transaction manager 505 in response to a telephone number indicating that entity 105(i) wished to choose from among transaction types belonging to a class of transaction types.

As before indicated, switch 107 provides transaction identifier 511 to transaction manager 505. In they following, transaction identifier 511 is presumed to identify transaction algorithm 507(b). In response to transaction identifier 511, transaction manager 505 begins to execute transaction algorithm (TALC) 507(b). As required by transaction algorithm 507(b), transaction manager 505 provides signals to switch 107 which cause switch 107 to connect entities involved in the transaction to each other or to transaction manager 505 and to receive information from and provide information to the entities as required for the transaction. Additionally, certain entities involved in the transaction may be directly accessible to transaction manager 505 without involving switch 107.

In FIG. 5, transaction algorithm 507(b) is taken to define a transaction involving three entities: E 105(i) which initiated it, E 105(j), and E 105(k). As required by algorithm 507(b), transaction manager 505 causes communications system 503 to solicit transaction information from the entities and provide the transaction information to the entities and to transaction manager 505 as required for the transaction. Thus, transaction information 519 concerns entity 105(i), transaction information 515 concerns entity 105(k), and transaction information 517 concerns entity 105(j). As shown in FIG. 5, transaction manager 505 may employ either signal paths or message paths for the transaction information, and may connect entities to each other or to itself, all as required by transaction algorithm 507(b). Flow of control in transaction algorithm 507(b) may of course depend on values which transaction manager 505 receives in the transaction information obtained from the entities. Additionally, transaction algorithm 507(b) may employ other transaction algorithms in algorithm list 509 to perform portions of the transaction.

The algorithms in algorithm list 509 may all be provided by the operator of communications system 503. In other embodiments, the operator of communications system 503 may permit certain users of the communications system to provide transaction algorithms for transaction algorithm list 509. Indeed, one of the transactions mediated by communications system 503 might be the installation of a transaction algorithm 507 in list 509. In such a transaction, transaction manager 507 would respond to the transaction identifier identifying the transaction by soliciting the new algorithm 507 from the initiating entity 105, would submit the new algorithm 507 to other entities for confirmation of its correctness, and on receiving the confirmation, would install the new algorithm in list 509. If the algorithm were found not to be correct, transaction manager 507 could return error messages to the initiating entity. Any or all of the algorithms can of course employ transaction records 701 as described above.

Figure 6:
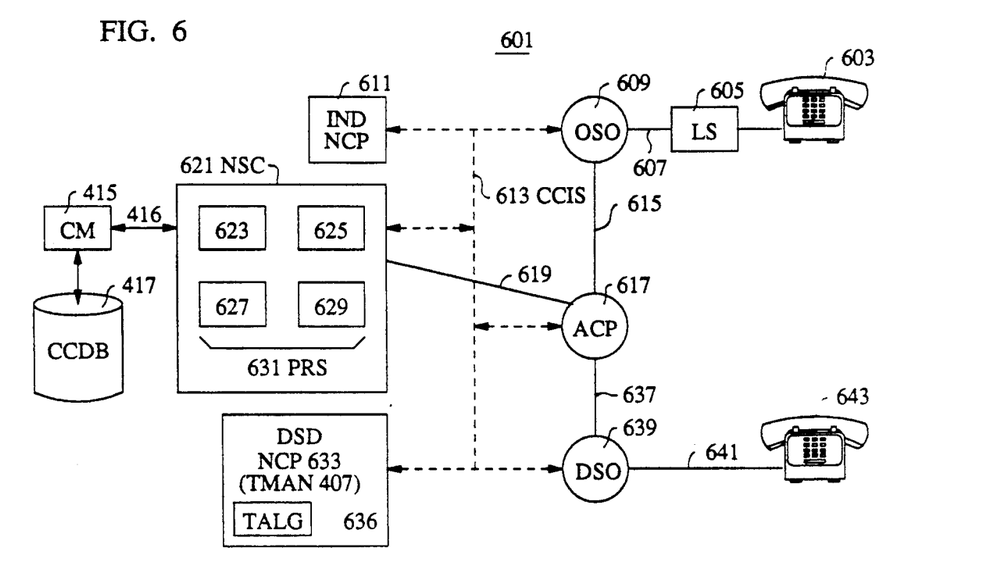
FIG. 6 is an exemplary implementation of the system of FIG. 4 in the telephone system.

Implementation of System 401 in a Telephone System: FIG. 6

FIG. 6 shows an implementation of system 401 in a contemporary telephone system. As will be clear to those of ordinary skill in the art, the techniques used to implement system 401 in the telephone system may also be employed to implement systems 301 and 501.

Modern telephone switching networks are stored program controlled networks, that is, the behavior of elements of the network is governed by stored programs. The stored program controlled network provided by AT&T is described in detail in the Bell System Technical Journal, vol. 61, No. 7, part 3, September, 1982, pp. 1573-1816. System 601 of FIG. 6 employs components of the AT&T stored program controlled network.

An important characteristic of the AT&T stored program controlled network is that there are separate paths for control signals and for messages. Messages travel by switched circuits, indicated in FIG. 6 by the solid lines 607, 615, 619, 637, and 641; the control signals travel by the common channel interoffice signalling facilities (CCIS), which is a packet network for carrying control messages between the components of the network. All of the switches and telephone company-provided data bases in the stored program controlled network are connected to each other by CCIS, which appears in FIG. 6 as dashed line 613.

The following components of the AT&T stored program controlled network are employed in system 601:

CCIS-controlled switches 609, 617, and 639:
  Switch 609 is an Originating Screening Office (OSO), a switch which detects special classes of calls.
  Switch 617 is an Action Control Point (ACP), a switch which has access to facilities for handling certain kinds of calls.
  Switch 639 is a Destination Service Office, a switch which connects special classes of calls to their destinations.
Network control points (NCP) 611 and 633. A network control point provides messages to other components of the network as required to cause the network to perform a given function.
  IND NCP 611 contains a data base of special numbers such as 800 numbers and provides messages indicating how the special numbers are to be handled by the switching system.
  DSD NCP 633 contains a data base of special telephone services and provides messages which cause the switching system to carry out the special service. In system 601, DSD NCP 633 performs the function of transaction manager 407.
Network Services Complex (NSC) 621 implements certain primitive functions (PRS) 631 in response to messages on CCIS 613. Primitive functions used in system 601 include provision of voice announcements 623, decoding of DTMF signals 625, establishment of data links 627, and call routing 629.

Additional components of system 601 include Touch-Tone telephone 603, belonging to customer 403 of FIG. 4, Touch-Tone telephone 643, belonging to vendor 405 of FIG. 4, local switch 605, which connects telephone 603 to the stored program switching network, credit manager 415, which determines the credit status of a customer, and credit card data base 417, which contains the credit information. Credit manager 415 is connected via data link 416 to NSC 621. It should be pointed out that conceptually, switches 609, 617, 639, NSC 621, and IND NCP 611 together perform the functions of switch 107 in FIG. 4.

System 601 operates as follows to perform the mediated credit transaction described with reference to system 401. Customer 403 uses telephone 603 to dial a special number, perhaps beginning with a prefix such as 990. The special number identifies at least the kind of transaction. The dialed number goes to local switch 605, which provides it via circuit 607 to OSO 609. OSO 609 determines that the number is special, and sends a message via CCIS 613 to IND NCP 611. The message contains at least the special telephone number.

IND NCP 611 determines from the special number that the call must be handled by ACP 617, because that switch has a Network Services Complex 621 associated with it. Consequently, IND NCP 611 sends a CCIS message to OSO 609 which specifies the number of telephone 643, the type of special service required and DSD NCP 633, and which further identifies access control point 617. OSO 609 responds to the message by forwarding the call to action control point 617, as indicated by circuit 615, and sending a CCIS message to ACP 617 which includes the the telephone number of telephone 643, the type of special service required, and a specification of DSD NCP 633, as well as the telephone number of telephone 603, as provided by ANI.

On receipt of the message from OSO 609, ACP 617 sends a CCIS message to DSD NCP 633 which includes the type of special service required and the telephone numbers of telephones 643 and 603. DSD NCP 633 then locates transaction algorithm 636 corresponding to the type of special service required and begins executing the algorithm. As DSD NCP 633 executes the algorithm, it sends CCIS messages to the components of the stored program network which cause the stored program network to mediate the transaction.

The first step in the transaction is to obtain the credit card number of customer 403. NCP 633 sends a CCIS message to NSC 621 which instructs it to use call muting primitive 629 to connect itself to telephone 603. The muting primitive does so, as shown by circuit 619, and NCP 633 then sends a CCIS message to NSC 621 to use announcement primitive 623 to request that the user of telephone 603 input his credit card number using the Touch-Tone buttons on the telephone and to use DTMV decoding primitive 625 to decode the inputs received from the Touch-Tone buttons and send them via CCIS to NCP 633. Continuing to execute TALG 636, NCP 633 determines whether the proper number of digits have been sent. If not, it sends a CCIS message to NSC 621 to use primitive 623 to inform the user of telephone 603 of his error and primitive 625 to collect new input. Once NCP 633 has the proper number of digits, it stores them and sends a CCIS message to NSC 621 requesting it to route the call from ACP 617 to telephone 643, thereby connecting customer 403 and vendor 405 and to listen for DTMF tones from telephone 643.

Execution of transaction algorithm 636 continues after customer 403 and vendor 405 have agreed to the transaction and vendor 405 uses his Touch-Tone buttons to input the price on telephone 643. Component 625 of NSC 621 decodes the DTMF tones and provides the price via a CCIS message to DSD NCP 633, which then sends a CCIS message to NSC 621 requesting it to use component 627 to set up a data link with credit manager 415, and when the link is set up, another CCIS message asking it to provide the credit card number, the telephone number of telephone 643, and the price to credit manager 415 and to return credit manager 415's response. Credit manager 415 then consults data base 417, and if customer 403 has the necessary balance, debits customer 403's account and credits vendor 405's account (identified by the vendor's telephone number). Credit manager 415 returns a value indicating the success or failure of the transaction to NSC 621, which in turn provides it to NCP 633; depending on the value, NCP 633 requests announcing facility 623 in NSC 621 to indicate to the vendor at telephone 643 whether the transaction succeeded, completing transaction algorithm 636.

Many variations in system 601 and transactions algorithm 636 are possible. For example, vendor 405, customer 403, or both may have integrated services digital network (ISDN) service, and in that case, telephone 603 or 643 may be replaced by a display terminal and keyboard. In such an embodiment, NSC 621 would provide prompts to the terminal instead of voice prompts. Further, NSC 621 may include voice recognition primitives; in that case customer 403 could input his credit card number orally, and vendor 405 could do the same with the price. Credit manager 415 may have several different relationships with the remainder of system 601. It can itself be implemented as a network control point, it can be connected by a data link, as in FIG. 6, or it can be connected by a switched circuit, as are telephones 603 and 643.

As regards transaction algorithm 636, the interactions between system 601 and customer 403 and vendor 405 can be expanded. For example, customer 403 might be asked to provide additional identifying information and vendor 405 might be asked to provide a vendor identification number along with the price. The vendor id number would then be used to identify the vendor's account in data base 417. Further, the credit verification could be done in two stages. In the first stage, performed on receipt of the credit card number, the existence of the customer's account could be verified; in the second stage, the account could be debited. Moreover, any of the telephone number translation services described in the discussion of the prior art could be used in conjunction with system 601. Additionally, credit card data base 417 can include transaction records 701, and these records can be used as described above with regard to system 401 to resume an interrupted transaction or to provide information for collateral transactions.

Conclusion

The foregoing Detailed Description has disclosed to one of ordinary skill in the an to which the invention pertains how one may make and use a communications system which mediates transactions between entities reachable by the communications system. However, as is apparent from the nature of the invention and the Detailed Description, the number of particular embodiments of the invention is essentially unlimited. For example, systems of the type disclosed herein may be used for telephone voting. In such a system, the transaction manager would determine the eligibility of the voter to vote, and if he is eligible, would provide the vote to the entity in charge of counting.

Another use for such a system is a gift or donation registration service. An entity seeking gifts or donations would provide a list of what it needed to the registration service. Entities wishing to make gifts or donations would call the registration service and the service would mediate a transaction between the donor and the source of the item to be given or donated.

Still other uses involve assigning available resources of a given type to clients who call for assistance. One example of such a system is a lawyer referral service. The referral service would maintain a database of lawyers and would assign lawyers to clients on a basis which assured that each lawyer would get a fair share of the referrals. The system would determine from the database which lawyer was to get the referral and would connect the lawyer with the calling client.

Additionally, a communications system may be advantageously used to mediate a transaction such as an auction. Customers could make bids. The communications system would validate the bids and provide them to the auctioneer, who would know only the mounts, and not the identities of the bidders. The communications system could then indicate to each participant the current highest bid and solicit new bids until a single highest bid remained. In some embodiments, the communications system itself might play the role of auctioneer. In such an embodiment, the transaction manager would keep track of the current highest bid, would inform the participants of that bid, and when bidding had ceased, would complete the transaction with the highest bidder.

Further, as previously pointed out, the invention may be employed in any communications system which actively connects a sender of a message with a recipient of a message. Since the details of a particular embodiment of the invention are strongly dependent on the kind of communications system being used and the kind of transaction being mediated, the embodiments disclosed in the Detailed Description are to be considered in all respects as being merely illustrative and exemplary, but not restrictive, and the scope of the invention is not to be determined from the disclosed embodiments, but rather from the attached claims as read in light of the Specification and interpreted according to the Doctrine of Equivalents.

What is claimed is:

1. A method of employing a communications routing system of a type which functions generally to establish connections with arbitrary ones of a plurality of entities to in addition mediate a transaction involving delayed payment between certain ones of the entities including a customer, a vendor, and an approving entity which approves the transaction, the method comprising the steps of:
    receiving a transaction specifier from the customer in the communications routing system; and
    responding in the communications routing System to the transaction specifier by performing steps including
    obtaining at least an identifier known to the approving entity from the customer,
    obtaining at least a debit amount from the vendor,
    providing the identifier and the debit amount to the approving entity,
    receiving an indication from the approving entity whether the transaction is approved, and
    providing the indication to the vendor, the communications routing system functioning during the steps to establish connections with the certain ones of the entities as required for the steps.

2. The method set forth in claim 1 wherein:

the step of responding to the transaction specifier includes the step of employing the communications system to connect the customer and the vendor with each other.

3. The method set forth in claim 2 wherein:

the step of employing the communications system to connect the customer and the vendor occurs before the step of obtaining a debit amount from the vendor.

4. The method set forth in claim 1 wherein:

the method does not include any step in which the identifier is disclosed to the vendor.

5. The method set forth in claim 1 wherein:

the communications routing system is a switching portion of a telephone system; and the step of receiving a transaction specifier includes the steps of:

receiving a special telephone number in the switching portion; and using the special telephone number to derive the transaction specifier.

6. The method set forth in claim 5 wherein:

the step of receiving a transaction specifier further includes the step of using the special telephone number to derive a telephone number of the vendor and the step of responding to the transaction specifier includes the step of using the telephone number to obtain transaction information concerning the transaction from or provide transaction information to the vendor.

7. The method set forth in claim 5 wherein:

the switching portion retains the telephone number from which the special telephone number was called; and the step of responding to the transaction specifier includes obtaining the telephone number from which the special telephone number was called from the telephone system as part of the transaction information.

8. The method set forth in any one of claims 1, 2, 3, 4, 5, 6, or 7 wherein:

the steps performed in response to the transaction specifier include entering information concerning the transaction in a transaction record.

9. The method set forth in claim 8 wherein:

the method further includes the steps of receiving a further transaction specifier in the communications system; and responding to the further transaction specifier by performing a further transaction as specified by the further transaction specifier and the transaction record.

10. A method of employing a telephone system including a switching portion to mediate a transaction involving delayed payment between a customer, a vendor, and an approving entity which approves the transaction, the telephone system being able to establish connections to the customer, the vendor, and the approving entity and the method comprising the steps of:

receiving a call in the switching portion which employs a special telephone number specifying the transaction; and responding in the switching portion to the special telephone number by performing steps including
  determining a telephone number for the vendor;
  causing the telephone system to request an identifier known to the approving entity from the customer;
  causing the telephone system to receive and store the identifier;
  causing the telephone system to use the telephone number for the vendor to connect the customer with the vendor;
  receiving a transaction amount in the telephone system from the vendor;
  providing the identifier and the transaction amount to the approving entity; and
  responding to an indication by the approving entity whether the transaction is approved by providing the indication to the vendor.

11. A method of employing a communications routing system of a type which functions generally to establish connections with arbitrary ones of a plurality of entities to in addition mediate a plurality of types of transactions involving certain ones of the entities which have between them transaction information other than the information required by the communications system to establish communications between the entities, the method comprising the steps of:

receiving a transaction type specifier specifying one of the types of transactions in the communications routing system;

in the communications routing system, responding to the transaction type specifier by activating a transaction manager within the communications routing system; and in the transaction manager, selecting a transaction algorithm corresponding to the transaction type specified by the transaction type specifier from a set of transaction algorithms; and in the transaction manager, performing as required by the transaction algorithm the steps of employing the communications routing system to obtain first transaction information from at least one of the entities involved in the transaction and employing the communications routing system to provide second transaction information to at least one of the entities involved in the transaction, the communications routing system functioning during the steps to establish connections with the certain ones of the entities as required for the steps.

12. The method set forth in claim 11 wherein:

for a first set of at least one of the transaction types, the step of providing second transaction information provides second transaction information including less than all of the first transaction information.

13. The method set forth in claim 12 wherein:

for at least one of the first set of transaction types, the step of obtaining first transaction information includes the step of obtaining an entity identifier for at least one of the entities as part of the first transaction information; and for the at least one transaction type, the step of providing second transaction information provides second transaction information which does not include the entity identifier.

14. The method set forth in claim 13 wherein:

the step of obtaining first transaction information further includes the steps of obtaining a transaction amount from at least one of the entities as at least part of the first transaction information; and including an indication of the capability of the entity identified by the entity identifier to perform a transaction in the mount of the transaction amount as part of the second transaction information.

15. The method set forth in claim 11 wherein:
the steps performed as required by the transaction algorithm include the step of employing the communications system to connect entities with each other as required by the transaction.

16. The method set forth in claim 11 wherein:
the communications routing system is a switching portion of a telephone system; and
the step of receiving a transaction specifier includes the steps of:
receiving a special telephone number in the switching portion; and
using the special telephone number to derive the transaction specifier.

17. The method set forth in claim 16 wherein:
the step of receiving a transaction specifier further includes the step of using the special telephone number to derive a telephone number of one of the entities and
the step of responding to the transaction specifier includes the step of using the telephone number to obtain transaction information from or provide transaction information to the entity reachable by the telephone number.

18. The method set forth in claim 16 wherein:
the switching portion retains the telephone number from which the special telephone number was called; and
the step of responding to the transaction specifier includes obtaining the telephone number from which the special telephone number was called from the switching portion as part of the first transaction information.

19. The method set forth in any one of claims 11 through 18 wherein:
the steps performed in the transaction manager further include the step of entering information concerning the transaction in a transaction record.

20. The method set forth in claim 19 wherein:
the method further includes the steps of
receiving a further transaction type specifier in the communications system; and
in the transaction manager, performing a further transaction as required by the transaction record and the transaction algorithm corresponding to the further transaction type specifier.

21. A method of employing a communications routing system of a type which functions generally to establish connections with arbitrary ones of a plurality of entities to in addition mediate transactions involving certain ones of the entities, the method comprising the steps of:
receiving a transaction specifier specifying a first one of the transactions from one of the entities in the communications routing system;
responding in the communications muting system to the transaction specifier by performing steps including
obtaining transaction information from at least one of the entities as required by the first one of the transactions,
entering the transaction information in a transaction record for the first one of the transactions stored in the communications routing system, and
ending the first one of the transactions;
receiving a further transaction specifier from one of the entities in the communications system; and responding to the further transaction specifier by performing a further transaction as specified by the further transaction specifier and the transaction record, the communications routing system functioning during the steps to establish connections with the certain ones of the entities as required for the steps.

22. The method set forth in claim 21 wherein:
the step of ending the first one of the transactions is performed as a result of an interruption of the first one of the transactions; and
the step of performing the further transaction consists of continuing the interrupted first one of the transactions.

23. The method set forth in claim 22 wherein:
the step of ending the first one of the transactions is performed when the first one of the transactions is interrupted by one of the participants.

24. The method set forth in claim 21 wherein:
the first transaction and the further transaction are stages of a larger transaction which involves more stages than the first transaction and the further transaction.

25. The method set forth in claim 21 wherein:
the further transaction is a separate transaction which requires the transaction information in the transaction record.

26. The method set forth in any one of claims 21, 22, 24, or 25 wherein:
the step of responding to the transaction specifier includes the steps of associating a transaction identifier with the transaction record and providing the transaction identifier to at least one of the entities; and
the step of responding to the further transaction specifier includes the steps of
receiving the transaction identifier from the at least one entity and
employing the transaction identifier to locate the associated transaction record.

27. The method set forth in any one of claims 21, 22, 24, or 25 wherein:
the step of responding to the transaction specifier includes the step of placing the transaction record in a predetermined order with respect to any other transaction records for transactions involving the entities; and
the step of responding to the further transaction identifier includes the step of
employing the predetermined order to locate the transaction record.

28. A method of employing a communications system to mediate a transaction involving delayed payment between a customer, a vendor, and an approving entity which approves the transaction, the method comprising the steps of:
receiving a transaction specifier from the customer in the communications system; and
responding to the transaction specifier by performing steps in the communications system including
obtaining at least an identifier known to the approving entity from the customer,
obtaining at least a debit amount from the vendor,
providing the identifier and the debit amount to the approving entity,
receiving an indication from the approving entity whether the transaction is approved, and
providing the indication to the vendor without providing the identifier to the vendor.

* * * * *